(12) United States Patent
Johansson et al.

(10) Patent No.: US 10,757,575 B2
(45) Date of Patent: Aug. 25, 2020

(54) INCREASED SECURITY FOR MULTILATERATION TIMING ADVANCE

(71) Applicant: TELEFONAKTIEBOLAGET LM ERICSSON (PUBL), Stockholm (SE)

(72) Inventors: Nicklas Johansson, Brokind (SE); John Walter Diachina, Garner, NC (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/455,403

(22) Filed: Jun. 27, 2019

(65) Prior Publication Data

US 2019/0320321 A1 Oct. 17, 2019

Related U.S. Application Data

(62) Division of application No. 15/977,887, filed on May 11, 2018, now Pat. No. 10,382,968.

(60) Provisional application No. 62/505,046, filed on May 11, 2017.

(51) Int. Cl.
| | |
|---|---|
| *H04W 12/12* | (2009.01) |
| *H04W 64/00* | (2009.01) |
| *H04W 56/00* | (2009.01) |
| *H04W 12/10* | (2009.01) |
| *H04W 12/08* | (2009.01) |

(52) U.S. Cl.
CPC .......... *H04W 12/12* (2013.01); *H04W 12/08* (2013.01); *H04W 12/10* (2013.01); *H04W 56/004* (2013.01); *H04W 64/00* (2013.01); *H04W 64/006* (2013.01)

(58) Field of Classification Search
CPC ...... H04W 12/12; H04W 12/08; H04W 12/10
USPC ........................................................ 455/410
See application file for complete search history.

(56) References Cited

U.S. PATENT DOCUMENTS

| | | | |
|---|---|---|---|
| 7,016,690 B2 | 3/2006 | Corson et al. | |
| 2004/0203849 A1* | 10/2004 | Allison | H04L 63/30 455/456.1 |
| 2005/0182565 A1* | 8/2005 | Bourdeaut | G01S 19/48 701/469 |

OTHER PUBLICATIONS

R6-170151 (revision of R6-170148), Change request CR 43.059, 0081, version 13.2.0, Introduction of Multilateration; Source: Ericsson LM; 3GPP RAN WG6 Meeting #3, Athens, Greece; Feb. 13-17, 2017, the whole document.

(Continued)

*Primary Examiner* — Chuck Huynh

(57) ABSTRACT

A positioning node (e.g., SMLC), a Radio Access Network (RAN) Node (e.g., BSS/BTS), and a wireless device (e.g., MS) are described herein which implement procedures and corresponding modified or new messages/information elements/fields to reduce the possibility of a bandit (e.g., invalid or unauthorized) wireless device from triggering the RAN Node (e.g., BSS/BTS) to generate false timing advance (TA) information associated with the wireless device and report the false TA information to the positioning node (e.g., SMLC) which leads the positioning node (e.g., SMLC) to estimate with degraded accuracy a position of the wireless device.

12 Claims, 7 Drawing Sheets

(56) References Cited

OTHER PUBLICATIONS

3GPP TS 43.059 V14.0.0 (Mar. 2017), 3rd Generation Partnership Project; Technical Specification Group Radio Access Network; Functional stage 2 description of Location Services (LCS) in GERAN, (Release 14), Mobile Competence Centre ' 650, Route Des Lucioles; F-06921, Sophia-Antipolis Cedex ' France, vol. RAN WG6, Mar. 20, 2017, pp. 1-82.

\* cited by examiner

202

RRLP MTA REQUEST MESSAGE'S MTA METHOD INFORMATION ELEMENT

```
MTA-Method ::= CHOICE {
    rlc-Data-Block-Method    NullRLC-Data-Block-Method,
    access-Burst    NULL,
    extended-Access-Burst    Extended-Access-Burst,
    spare NULL
}

RLC-Data-Block-Method ::= SEQUENCE {
    spare-Random-ID   INTEGER (0..255)/set of spare-Random IDs
}
                        └─ 200b              ╲
                                              200c
Extended-Access-Burst ::= SEQUENCE {
    mta-Reference-ID    INTEGER (0..65535),
    short-BSS-ID    INTEGER (0..7),
    spare-mini-Random-ID   INTEGER (0..7)/set of spare-mini-Random IDs/UNIQUE ID
}                       └─ 200e                ╲              ╲
                                                200f           200g
Co-Sited-Cells ::= SEQUENCE {
    arfcn    INTEGER (0..1023),
    bsic-Info   BSIC-Info
}

Cell-Set ::= SEQUENCE {
    cell-Set-Member1    Cell-Set-Member,
    cell-set-Member2    Cell-Set-Member    OPTIONAL,
    cell-set-Member3    Cell-Set-Member    OPTIONAL,
    cell-set-Member4    Cell-Set-Member    OPTIONAL,
    cell-set-Member5    Cell-Set-Member    OPTIONAL,
    cell-set-Member6    Cell-Set-Member    OPTIONAL
}

Cell-Set-Member ::= SEQUENCE {
    arfcn    INTEGER (0..1023),
    bsic-Info   BSIC-Info,
    short-ID INTEGER (0..255)    OPTIONAL,
    random-ID INTEGER (0..255)      OPTIONAL,  ─ 200a
    mini-random-ID INTEGER (0..7)   OPTIONAL,  ╲ 200d
```

FROM FIG. 2A

```
    ec-cell-information CHOICE {
        ec-RACH-Control-Parameters  EC-RACH-Control-Parameters, -- May be included for any
member of
        -- a Cell-Set that supports EC-GSM-IoT (see sub-clause A.9).
        default-ec-RACH-Control-Parameters NULL -- Indicates a member uses the same
ec-RACH-Control-
        -- Parameters as any other member of the Cell-Set for which this information is provided.
    }
    peo-cell-information CHOICE {
        rach-Control-Parameters  RACH-Control-Parameters, -- May be included for any member of
        -- a Cell-Set that supports PEO (see sub-clause A.9).
        Default-rach-Control-Parameters NULL -- Indicates a member uses the same rach-Control-
        -- Parameters as any other member of the Cell-Set for which this information is provided.
    }
}

BSIC-Info ::= SEQUENCE {
    radio-Frequency-Colour-Code  INTEGER (0..7),
    network-Colour-Code      INTEGER (0..7),
    base-station-Colour-Code    INTEGER (0..7)
}

EC-RACH-Control-Parameters ::= SEQUENCE {
    ec-BS-CC-CHANS    INTEGER (0..3),
    ec-RXLEV-ACCESS-MIN       INTEGER (0..63),
    ms-TXPWR-MAX-CCH    INTEGER (0..31),
    lb-MS-TXPWR-MAX-CCH      INTEGER (0..31)   OPTIONAL,
    cell-SELECTION-RLA-MARGIN      INTEGER (0..7)     OPTIONAL,
    dl-CC-Selection       BOOLEAN,
    bt-Threshold-DL      INTEGER (0..31),
    cc2-Range-DL  INTEGER (0..31)    OPTIONAL,
    cc3-Range-DL  INTEGER (0..31)    OPTIONAL,
```

FROM FIG. 2B

```
    bt-Threshold-UL    INTEGER (0..31),
    cc2-Range-UL  INTEGER (0..31)    OPTIONAL,
    cc3-Range-UL  INTEGER (0..31)    OPTIONAL,
    bsPWR    INTEGER (0..63),
    dl-Signal-Strength-Step-Size    INTEGER (0..3)    OPTIONAL,
    ec-Reduced-PDCH-Allocation  BOOLEAN, ec-Max-Retrans    INTEGER , sm INTEGER (0..3),
    tm INTEGER (0..3),
    access-Timeslots    BOOLEAN,
    alpha INTEGER (0..15)    OPTIONAL,
    t3168 INTEGER (0..7)    OPTIONAL,
    t3192 INTEGER (0..7)    OPTIONAL,
    t3226 INTEGER (0..7)    OPTIONAL,
    t3248 INTEGER (0..3),
    mta-BITMAP    MTA-BITMAP
}

RACH-Control-Parameters ::= SEQUENCE {
    rxlev-ACCESS-MIN INTEGER (0..63),
    ms-TXPWR-MAX-CCH    INTEGER (0..31),
    max-Retrans INTEGER (0..3),
    tx-integer INTEGER (0..15),
    mta-BITMAP    MTA-BITMAP
}

MTA-BITMAP ::= SEQUENCE {
    mta-RLC-Data-Block-method BOOLEAN,
    mta-Access-Burst-method BOOLEAN,
    mta-Extended-Access-Burst-method BOOLEAN,
    mta-spare BOOLEAN
}
```

FIG. 2C

INCREASED SECURITY FOR MULTILATERATION TIMING ADVANCE

CLAIM OF PRIORITY

This application is a divisional of U.S. patent application Ser. No. 15/977,887 filed May 11, 2018, which claims the benefit of priority to U.S. Provisional Patent Application No. 62/505,046, filed May 11, 2017. The entire contents of these documents are fully incorporated herein by reference for all purposes.

TECHNICAL FIELD

The present disclosure relates generally to the wireless telecommunications field and, more particularly, to a positioning node (e.g., SMLC), a Radio Access Network (RAN) Node (e.g., BSS/BTS), and a wireless device (e.g., MS) which implement procedures and corresponding modified or new messages/information elements/fields to reduce the possibility of a bandit (e.g., invalid or unauthorized) wireless device from triggering the RAN Node (e.g., BSS/BTS) to generate false timing advance (TA) information associated with the wireless device and report the false TA information to the positioning node (e.g., SMLC) which leads the positioning node (e.g., SMLC) to estimate with degraded accuracy a position of the wireless device.

BACKGROUND

The following abbreviations are herewith defined, at least some of which are referred to within the following description of the present disclosure.
3GPP 3rd-Generation Partnership Project
AB Access Burst
AGCH Access Grant Channel
ASIC Application Specific Integrated Circuit
BSS Base Station Subsystem
BTS Base Transceiver Station
CN Core Network
CR Change Request
eNB Evolved Node B
EDGE Enhanced Data rates for GSM Evolution
EGPRS Enhanced General Packet Radio Service
eMTC Enhanced Machine Type Communications
E-SMLC Evolved-Serving Mobile Location Center
E-UTRAN Evolved Universal Terrestrial Radio Access Network
GSM Global System for Mobile Communications
GERAN GSM/EDGE Radio Access Network
GPRS General Packet Radio Service
ID Identifier
IoT Internet of Things
LMU Location Measurement Unit
LTE Long-Term Evolution
MME Mobility Management Entity
MS Mobile Station
MTA Multilateration Timing Advance
MTC Machine Type Communications
NB Node B
NB-IoT Narrow Band Internet of Things
PDN Packet Data Network
PLMN Public Land Mobile Network
RACH Random Access Channel
RAN Radio Access Network
RAT Radio Access Technology
RLC Radio Link Control
RRLP Radio Resource Location Services Protocol
SMLC Serving Mobile Location Center
SGSN Serving GPRS Support Node
TA Timing Advance
TBF Temporary Block Flow
TDMA Time Division Multiple Access
TLLI Temporary Logical Link Identifier
TS Technical Specification
TSC Training Sequence Code
TSG Technical Specification Group
UE User Equipment
UL Uplink
UTRAN Universal Terrestrial Radio Access Network
WCDMA Wideband Code Division Multiple Access
WiMAX Worldwide Interoperability for Microwave Access The 3rd-Generation Partnership Project (3GPP) is completing work on the Release 14 "ePOS_GERAN" work item for positioning enhancements for the GSM/EDGE Radio Access Network (GERAN) which introduces enhanced methods for multilateration based position estimation of a mobile station (MS) that does not require any additional hardware (e.g., Location Measurement Units (LMUs) at the network side) for performing enhanced position estimation. The enhanced multilateration positioning methods and associated signaling procedures are described in a Change Request (CR) from Radio Access Network (RAN) Working Group 6 (WG6) Meeting #3 (see R6-170151; "CR 43.059 Introduction of Multilateration"; Source: Ericsson LM; Athens, Greece; 13-17 Feb. 2017 where the contents of which are hereby incorporated herein by reference for all purposes) and are included as part of the Rel-14 specifications. The enhanced MTA positioning methods include the Radio Link Control (RLC) data block method, the Access Burst method, and the Extended Access Burst method.

The RLC data block method, the Access Burst method, and the Extended Access Burst method all involve estimating the position of a mobile station (MS) based on timing advance values being estimated by the Base Station Subsystem (BSS)/Base Transceiver Station (BTS) for the MS while it is in the serving cell and in a subset of neighbor cells. To allow the BSS/BTS to estimate the timing advance value applicable to a given MS in a specific cell, the MS must perform the MTA procedure in the specific cell and provide some information (e.g., MS Sync Accuracy parameter, MS Transmission Offset parameter) to the BSS/BTS. The MS that has been commanded to perform the MTA procedure therefore performs an MTA access procedure in a subset of the neighbour cells (and optionally in the serving cell) and sends some information to the BSS/BTS thereby allowing the BSS/BTS to acquire corresponding timing advance information. This timing advance information is then forwarded by the BSS/BTS to the Serving Mobile Location Center (SMLC) which then processes it to estimate the position of the corresponding MS.

One drawback of the enhanced MTA procedure, when performed using the RLC Data Block method or the Extended Access Burst method, is that a bandit MS (e.g., invalid or unauthorized MS) can monitor MTA transmissions made by a valid MS in a given cell and duplicate them in a neighbour cell. The information provided by the bandit MS when sending MTA related transmissions in a neighbour cell can be selected with the purpose of misleading the BSS/BTS receiving those transmissions thereby causing the BSS/BTS to estimate a substantially inaccurate timing advance value for the valid MS. This then leads to the SMLC processing the full set of timing advance values including the misleading timing advance value it receives for the valid MS and estimating a corresponding position of the valid MS with degraded accuracy. A more detailed discussion is provided next to explain the problems associated with the RLC Data Block method and the Extended Access Burst Method.

Problems with RLC Data Block Method:

The SMLC triggers the MTA procedure for a valid MS by sending a Radio Resource Location services Protocol (RRLP) Multilateration Timing Advance Request message to the valid MS indicating that the RLC Data Block method is to be used. The valid MS upon receiving the RRLP Multilateration Timing Advance Request message proceeds to perform the MTA procedure using the RLC Data Block method as follows:

The valid MS sends a multilateration access request message on the random access channel (RACH) followed by an uplink Temporary Block Flow (TBF) establishment to enable the transfer of a single RLC data block. The RLC data block sent by the MS includes Temporary Logical Link Identifier (TLLI), MS Sync Accuracy and MS Transmission Offset parameters.

A bandit MS that detects the transmission of the multilateration access request message on the random access channel (RACH) also monitors the access grant channel (AGCH) to determine the packet resources that the BSS assigns the valid MS to be used for transmitting the RLC data block.

The bandit MS then monitors the RLC data block transmitted by the valid MS and thereby determines the TLLI, MS Sync Accuracy and MS Transmission offset parameters included therein.

The bandit MS can then re-select to one or more neighbour cells and send a multilateration access request message on the random access channel (RACH) followed by an uplink TBF establishment to enable the transfer of a single RLC data block.

The bandit MS includes the same TLLI used by the valid MS and a misleading MS Transmission Offset value in the single RLC data block it sends, thereby causing the serving BSS/BTS to estimate a substantially inaccurate timing advance value for the MS corresponding to the TLLI.

The BSS/BTS does not know it has estimated a timing advance value for a bandit MS and so it sends the SMLC a report containing what can include a substantially inaccurate timing advance value for the MS corresponding to the received TLLI.

The SMLC then uses this substantially inaccurate timing advance value when estimating the position of the corresponding valid MS thereby resulting in an estimated position that can have substantially degraded accuracy.

Problems with Extended Access Burst Method:

The SMLC triggers the MTA procedure for a valid MS by sending a RRLP Multilateration Timing Advance Request message to the valid MS indicating that the Extended Access Burst method is to be used. The valid MS upon receiving the RRLP Multilateration Timing Advance Request message proceeds to perform the MTA procedure using the Extended Access Burst method as follows:

The valid MS sends a first multilateration access request message on the random access channel (RACH) using an Access Burst followed by sending a second multilateration access request message on the random access channel (RACH) using a Normal Burst. The payload within the first and second multilateration access request messages include MTA Reference ID Low, MTA Reference ID High, MS Sync Accuracy and MS Transmission Offset parameters.

A bandit MS that detects the transmission of the first multilateration access request message on the random access channel (RACH) will be able to determine the MTA Reference ID Low (4 least significant bits of the 16 bit MTA Reference ID) and the MS Transmission Offset of the valid MS.

The bandit MS that detects the transmission of the second multilateration access request message on the random access channel (RACH) will be able to determine the MTA Reference ID Low (4 least significant bits of the 16 bit MTA Reference ID), the MTA Reference ID High (12 most significant bits of the 16 bit MTA Reference ID), and the MS Sync Accuracy of the valid MS.

The bandit MS can assume it has detected a matching pair of first and second multilateration access request messages on the random access channel (RACH) if both the first and second multilateration access messages have the same value for the MTA Reference ID Low parameter (4 least significant bits of the 16 bit MTA Reference ID).

The bandit MS can then re-select to one or more neighbour cells and send a first and a second multilateration access request message on the random access channel (RACH) and include the same MTA Reference ID Low and MTA Reference ID High parameters as sent by the valid MS but will include a misleading MS Transmission Offset value, thereby causing the serving BSS/BTS to estimate a substantially inaccurate timing advance value for the MS corresponding to the MTA Reference ID.

The BSS/BTS does not know it has estimated a timing advance value for a bandit MS and so it sends the SMLC a report containing what can be a substantially inaccurate timing advance value for the MS corresponding to the received MTA Reference ID.

The SMLC then uses this substantially inaccurate timing advance value when estimating the position of the corresponding MS thereby resulting in an estimated position that can have substantially degraded accuracy.

In view of the foregoing, it can be seen there is a need to address the aforementioned problems in the state-of-the art associated with the MTA procedure. The present disclosure addresses at least these problems.

SUMMARY

A positioning node (e.g., SMLC), a RAN node (BSS/BTS), a wireless device (e.g., MS) and various methods for addressing the aforementioned problems are described in the independent claims. Advantageous embodiments of the positioning node, the RAN node, the wireless device, and various methods are further described in the dependent claims.

In one aspect, the present disclosure provides a positioning node configured to interact with a RAN node and a wireless device. The positioning node comprises a processor and a memory that stores processor-executable instructions, wherein the processor interfaces with the memory to execute the processor-executable instructions, whereby the positioning node is operable to perform a transmit operation, a receive operation, a validate operation, and a calculate operation. In the transmit operation, the positioning node transmits, through the RAN node to the wireless device, a RRLP Multilateration Timing Advance Request message comprising at least one identifier and indicating a type of MTA procedure that is to be performed by the wireless device. In the receive operation, the positioning node receives, from the RAN node, timing advance information associated with the wireless device in a cell for which the MTA procedure has been performed, and one identifier corresponding to one of the at least one identifier within the RRLP Multilateration Timing Advance Request message, wherein the identifier corresponds to the cell in which the MTA procedure is performed. In the validate operation, the positioning node validates the timing advance information using the received identifier. In the calculate operation, the positioning node calculates a position of the wireless device using at least the validated timing advance information (note: the positioning node can calculate a position of the wireless device using multiple instances of validated timing advance information wherein each validated instance corresponds to a specific cell in which the wireless device has performed the MTA procedure). An advantage of the positioning node performing these operations is to reduce the possibility of a bandit wireless device triggering the RAN node to generate false timing advance information associated with the wireless device and report the false timing advance information to the positioning node which could lead the positioning node to estimate with degraded accuracy a position of the wireless device.

In another aspect, the present disclosure provides a method implemented by a positioning node configured to interact with a RAN node and a wireless device. The method comprises a transmitting step, a receiving step, a validating step, and a calculating step. In the transmitting step, the positioning node transmits, through the RAN node to the wireless device, a RRLP Multilateration Timing Advance Request message comprising at least one identifier and indicating a type of MTA procedure that is to be performed by the wireless device. In the receiving step, the positioning node receives, from the RAN node, timing advance information associated with the wireless device in a cell for which the MTA procedure has been performed, and one identifier corresponding to one of the at least one identifier within the RRLP Multilateration Timing Advance Request message, wherein the identifier corresponds to the cell in which the MTA procedure is performed. In the validating step, the positioning node validates the timing advance information using the received identifier. In the calculating step, the positioning node calculates a position of the wireless device using at least the validated timing advance information (note: the positioning node can calculate a position of the wireless device using multiple instances of validated timing advance information wherein each validated instance corresponds to a specific cell in which the wireless device has performed the MTA procedure). An advantage of the positioning node performing these steps is to reduce the possibility of a bandit wireless device triggering the RAN node to generate false timing advance information associated with the wireless device and report the false timing advance information to the positioning node which could lead the positioning node to estimate with degraded accuracy a position of the wireless device.

In one aspect, the present disclosure provides a RAN node configured to interact with a positioning node and a wireless device. The RAN node comprises a processor and a memory that stores processor-executable instructions, wherein the processor interfaces with the memory to execute the processor-executable instructions, whereby the RAN node is operable to perform a forward operation, a receive operation, a determine operation, and a transmit operation. In the forward operation, the RAN node forwards a RRLP Multilateration Timing Advance Request message received from the positioning node to the wireless device, wherein the RRLP Multilateration Timing Advance Request message comprises at least one identifier and indicates a type of MTA procedure that is to be performed by the wireless device. In the receive operation, the RAN node receives, from the wireless device, at least a MS Sync Accuracy parameter, a MS Transmission Offset parameter, and one identifier corresponding to one of the at least one identifier within the RRLP Multilateration Timing Advance Request message, wherein the one identifier also corresponds to a cell in which the wireless device performed the MTA procedure. In the determine operation, the RAN node determines timing advance information using at least the MS Sync Accuracy parameter and the MS Transmission Offset parameter, wherein the timing advance information is associated with the wireless device (note: the timing advance information is associated with the wireless device operating in a cell for which it has performed the MTA procedure). In the transmit operation, the RAN node transmits, to the positioning node, the timing advance information and the one identifier associated with the wireless device. An advantage of the RAN node performing these operations is to reduce the possibility of a bandit wireless device triggering the RAN node to generate false timing advance information associated with the wireless device and report the false timing advance information to the positioning node which could lead the positioning node to estimate with degraded accuracy a position of the wireless device.

In another aspect, the present disclosure provides a method implemented by a RAN node configured to interact with a positioning node and a wireless device. The method comprises a forwarding step, a receiving step, a determining step, and a transmitting step. In the forwarding step, the RAN node forwards a RRLP Multilateration Timing Advance Request message received from the positioning node to the wireless device, wherein the RRLP Multilateration Timing Advance Request message comprises at least one identifier and indicates a type of MTA procedure that is to be performed by the wireless device. In the receiving step, the RAN node receives, from the wireless device, at least a MS Sync Accuracy parameter, a MS Transmission Offset parameter, and one identifier corresponding to one of the at least one identifier within the RRLP Multilateration Timing Advance Request message, wherein the one identifier also corresponds to the cell in which the wireless device performed the MTA procedure. In the determining step, the RAN node determines timing advance information using at least the MS Sync Accuracy parameter and the MS Transmission Offset parameter, wherein the timing advance information is associated with the wireless device (note: the timing advance information is associated with the wireless device operating in a cell for which it has performed the MTA procedure). In the transmitting step, the RAN node transmits, to the positioning node, the timing advance information and the one identifier associated with the wireless device. An advantage of the RAN node performing these steps is to reduce the possibility of a bandit wireless device triggering the RAN node to generate false timing advance information associated with the wireless device and report the false timing advance information to the positioning node which could lead the positioning node to estimate with degraded accuracy a position of the wireless device.

In one aspect, the present disclosure provides a wireless device configured to interact with a positioning node and a RAN node. The wireless device comprises a processor and a memory that stores processor-executable instructions, wherein the processor interfaces with the memory to execute the processor-executable instructions, whereby the wireless device is operable to perform a receive operation, a perform operation, and a transmit operation. In the receive operation, the wireless device receives, from the positioning node through the RAN node, a RRLP Multilateration Timing Advance Request message comprising at least one identifier and indicating a type of MTA procedure that is to be performed by the wireless device. In the perform operation, the wireless device performs the MTA procedure to obtain a MS Sync Accuracy parameter and a MS Transmission Offset parameter. In the transmit operation, the wireless device transmits, to the RAN node, at least the MS Sync Accuracy parameter, the MS Transmission Offset parameter, and one identifier corresponding to one of the at least one identifier within the RRLP Multilateration Timing Advance Request message, wherein the identifier also corresponds to a cell in which the wireless device has performed the MTA procedure. An advantage of the wireless device performing these operations is to reduce the possibility of a bandit wireless device triggering the RAN node to generate false timing advance information associated with the wireless device and report the false timing advance information to the positioning node which could lead the positioning node to estimate with degraded accuracy a position of the wireless device.

In another aspect, the present disclosure provides a method implemented by a wireless device configured to interact with a positioning node and a RAN node. The method comprises a receiving step, a performing step, and a transmitting step. In the receiving step, the wireless device receives, from the positioning node through the RAN node, a RRLP Multilateration Timing Advance Request message comprising at least one identifier and indicating a type of MTA procedure that is to be performed by the wireless device. In the performing step, the wireless device performs the MTA procedure to obtain a MS Sync Accuracy parameter and a MS Transmission Offset parameter. In the transmitting step, the wireless device transmits, to the RAN node, at least the MS Sync Accuracy parameter, the MS Transmission Offset parameter, and one identifier corresponding to one of the at least one identifier within the RRLP Multilateration Timing Advance Request message, wherein the identifier also corresponds to a cell in which the wireless device has performed the MTA procedure. An advantage of the wireless device performing these steps is to reduce the possibility of a bandit wireless device triggering the RAN node to generate false timing advance information associated with the wireless device and report the false timing advance information to the positioning node which could lead the positioning node to estimate with degraded accuracy a position of the wireless device.

Additional aspects of the present disclosure will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the present disclosure.

BRIEF DESCRIPTION OF THE DRAWINGS

A more complete understanding of the present disclosure may be obtained by reference to the following detailed description when taken in conjunction with the accompanying drawings:

FIGS. 2A-2C is a diagram of a MTA method information element within a RRLP Multilateration Timing Advance Request message where the MTA method information element includes one of multiple possible identifiers in accordance with the different embodiments of the present disclosure;

DETAILED DESCRIPTION

Figure 1:
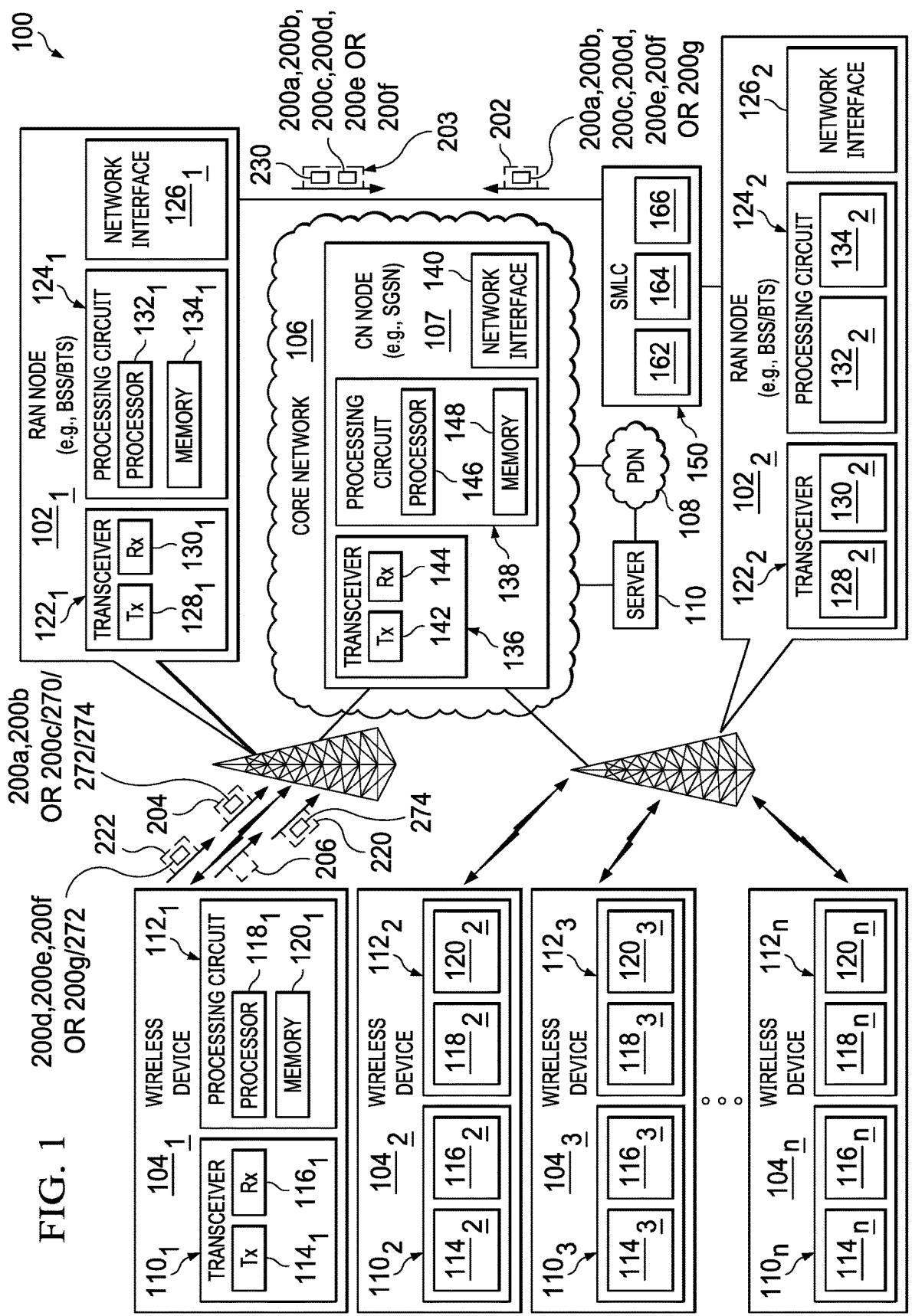
FIG. 1 is a diagram of an exemplary wireless communication network which includes a CN node, multiple RAN nodes, a positioning node, and multiple wireless devices configured in accordance with an embodiment of the present disclosure.

A discussion is first provided herein to describe an exemplary wireless communication network that includes a CN node (e.g., SGSN), multiple RAN nodes (e.g., BSSs/BTSs), a positioning node (e.g., SMLC), and multiple wireless devices (e.g., mobile stations) which are configured in accordance with different embodiments of the present disclosure (see FIG. 1). Then, a discussion is provided to disclose various embodiments of the present disclosure as to how the positioning node, the RAN node, and the wireless device can implement procedures and corresponding modified or new messages/information elements/fields to reduce the possibility of a bandit (e.g., invalid or unauthorized) wireless device triggering the RAN node to generate false timing advance (TA) information associated with the wireless device and report the false TA information to the positioning node which leads the positioning node to estimate with degraded accuracy a position of the wireless device (see FIGS. 2A-2C). Thereafter, a discussion is provided to explain the basic functionalities-configurations of the positioning node, the RAN node, and the wireless device in accordance with different embodiments of the present disclosure (see FIGS. 3-8).

Exemplary Wireless Communication Network 100

Referring to FIG. 1, there is illustrated an exemplary wireless communication network 100 in accordance with the present disclosure. The wireless communication network 100 includes a core network 106 (which comprises at least one CN node 107) and multiple RAN nodes $102_1$ and $102_2$ (only two shown) which interface with multiple wireless devices $104_1$, $104_2$, $104_3$ ... $104_n$. The wireless communication network 100 also includes many well-known components, but for clarity, only the components needed to describe the features of the present disclosure are described herein. Further, the wireless communication network 100 is described herein as being a GSM/EGPRS wireless communication network 100 which is also known as an EDGE wireless communication network 100. However, those skilled in the art will readily appreciate that the techniques of the present disclosure which are applied to the GSM/EGPRS wireless communication network 100 are generally applicable to other types of wireless communication systems, including, for example, WCDMA, LTE, and WiMAX systems.

The wireless communication network 100 includes the RAN nodes $102_1$ and $102_2$ (wireless access nodes—only two shown) which provide network access to the wireless devices $104_1$, $104_2$, $104_3$ ... $104_n$. In this example, the RAN node $102_1$ (e.g., BSS/BTS $102_1$) is providing network access to wireless device $104_1$ while the RAN node $102_2$ (e.g., BSS/BTS $102_2$) is providing network access to wireless devices $104_2$, $104_3$ ... $104_n$. The RAN nodes $102_1$ and $102_2$ are connected to the core network 106 (e.g., SGSN core network 106) and, in particular, to the CN node 107 (e.g., SGSN 107). The core network 106 is connected to an external packet data network (PDN) 108, such as the Internet, and a server 110 (only one shown). The wireless devices $104_1$, $104_2$, $104_3$ ... $104_n$ may communicate with one or more servers 110 (only one shown) connected to the core network 106 and/or the PDN 108. In this example, the RAN nodes $102_1$ and $102_2$ are all connected to a positioning node 150 (e.g., Serving Mobile Location Center 150).

The wireless devices $104_1$, $104_2$, $104_3$ ... $104_n$ may refer generally to an end terminal (user) that attaches to the wireless communication network 100, and may refer to either a MTC device (e.g., a smart meter) or a non-MTC device. Further, the term "wireless device" is generally intended to be synonymous with the term mobile device, mobile station (MS). "User Equipment," or UE, as that term is used by 3GPP, and includes standalone wireless devices, such as terminals, cell phones, smart phones, tablets, cellular IoT devices, IoT devices, and wireless-equipped personal digital assistants, as well as wireless cards or modules that are designed for attachment to or insertion into another electronic device, such as a personal computer, electrical meter, etc.

Likewise, unless the context clearly indicates otherwise, the term RAN node $102_1$ and $102_2$ (wireless access node $102_1$ and $102_2$) is used herein in the most general sense to refer to a base station, a wireless access node, or a wireless access point in a wireless communication network 100, and may refer to RAN nodes $102_1$ and $102_2$ that are controlled by a physically distinct radio network controller as well as to more autonomous access points, such as the so-called evolved Node Bs (eNodeBs) in Long-Term Evolution (LTE) networks.

Each wireless device $104_1$, $104_2$, $104_3$ ... $104_n$ may include a transceiver circuit $110_1$, $110_2$, $110_3$ ... $110_n$ for communicating with the RAN nodes $102_1$ and $102_2$, and a processing circuit $112_1$, $112_2$, $112_3$ ... $112_n$ for processing signals transmitted from and received by the transceiver circuit $110_1$, $110_2$, $110_3$ ... $110_n$ and for controlling the operation of the corresponding wireless device $104_1$, $104_2$, $104_3$ ... $104_n$. The transceiver circuit $110_1$, $110_2$, $110_3$ ... $110_n$ may include a transmitter $114_1$, $114_2$, $114_3$ ... $114_n$ and a receiver $116_1$, $116_2$, $116_3$ ... $116_n$, which may operate according to any standard, e.g., the GSM/EDGE standard. The processing circuit $112_1$, $112_2$, $112_3$ ... $112_n$ may include a processor $118_1$, $118_2$, $118_3$ ... $118_n$ and a memory $120_1$, $120_2$, $120_3$ ... $120_n$ for storing program code for controlling the operation of the corresponding wireless device $104_1$, $104_2$, $104_3$ ... $104_n$. The program code may include code for performing the procedures as described hereinafter.

Each RAN node $102_1$ and $102_2$ (wireless access node $102_1$ and $102_2$) may include a transceiver circuit $122_1$ and $122_2$ for communicating with wireless devices $104_1$, $104_2$, $104_3$ ... $104_n$, a processing circuit $124_1$ and $124_2$ for processing signals transmitted from and received by the transceiver circuit $122_1$ and $122_2$ and for controlling the operation of the corresponding RAN node $102_1$ and $102_2$, and a network interface $126_1$ and $126_2$ for communicating with the core network 106. The transceiver circuit $122_1$ and $122_2$ may include a transmitter $128_1$ and $128_2$ and a receiver $130_1$ and $310_2$, which may operate according to any standard, e.g., the GSM/EDGE standard. The processing circuit $124_1$ and $124_2$ may include a processor $132_1$ and 122, and a memory $134_1$ and $114_2$ for storing program code for controlling the operation of the corresponding RAN node $102_1$ and $102_2$. The program code may include code for performing the procedures as described hereinafter.

The CN node 107 (e.g., SGSN 107, MME 107) may include a transceiver circuit 136 for communicating with one or more RAN nodes, e.g., the RAN nodes $102_1$ and $102_2$, a processing circuit 138 for processing signals transmitted from and received by the transceiver circuit 136 and for controlling the operation of the CN node 107, and a network interface 140 for communicating with one or more RAN nodes, e.g., the RAN nodes $102_1$ and $102_2$. The transceiver circuit 136 may include a transmitter 142 and a receiver 144, which may operate according to any standard, e.g., the GSM/EDGE standard. The processing circuit 138 may include a processor 146 and a memory 148 for storing program code for controlling the operation of the CN node 107.

Techniques for Ensuring Bandit Wireless Device does not Cause False TA to be Sent to Positioning Node The present disclosure addresses the problems of the state-of-the-art as described above in the Background Section. More specifically, the present disclosure addresses the problems of the state-of-the-art by configuring the positioning node 150 (e.g., SMLC 150), the RAN node $102_1$ (e.g., BSS/BTS $102_1$) (for example), and the wireless device $104_1$ (for example) to implement procedures and corresponding modified or new messages/information elements/fields to reduce the possibility of a bandit wireless device $104_2$ (for example) triggering the RAN node $102_1$ to generate false TA information associated with the wireless device $104_1$ and report the false TA information to the positioning node 150 which leads the positioning node 150 to estimate with degraded accuracy a position of the wireless device $104_1$. A detailed discussion is provided below to describe several different ways that the positioning node 150, the RAN node $102_1$, and the wireless device $104_1$ can address the problems of the state-of-the-art.

Solutions for the RLC Data Block Method:

In a first embodiment of the present disclosure, the objective of reducing the possibility of a bandit wireless device $104_2$ (for example) from triggering the RAN node $102_1$ (e.g., BSS/BTS $102_1$) (for example) to generate false timing advance (TA) information and report the false TA information to the positioning node 150 (e.g., SMLC 150) is achieved through the introduction of identifier(s) 200a, 200b, 200c which are securely delivered to the valid wireless device $104_1$ in a triggering RRLP Multilateration Timing Advance Request message 202, where the identifier(s) 200a, 200b, 200c can subsequently be used by the positioning node 150 to link reports 203 received from the serving RAN node $102_1$ to the valid wireless device $104_1$ and the associated instance of the MTA procedure. More specifically, the following improvements can be made for the RLC Data Block method when selected by the positioning node 150:

The positioning node 150 can include a cell specific "Random ID" parameter 200a (e.g., 8 bits long) having a value randomly, or by other means, generated by the positioning node 150 for each cell for which it provides assistance information within the RRLP Multilateration Timing Advance Request message 200 (see FIGS. 2A-2C which illustrate a MTA method information element (including the Random ID parameter 200a) of the RRLP Multilateration Timing Advance Request message 202).

When using a cell identified by assistance information to perform MTA using the RLC Data Block method, the wireless device $104_1$ would include the corresponding cell specific "Random ID" value 200a as part of the information carried by the RLC Data Block 204.

The positioning node 150 may also include a "Spare Random ID" parameter 200b that does not correspond to a cell for which it provides cell specific assistance information (see FIGS. 2A-2C which illustrate a MTA method information element (including the Spare Random ID parameter 200b) in the RRLP Multilateration Timing Advance Request message 202). Alternatively, the positioning node 150 may provide the wireless device $104_1$ with a set of "Spare Random ID" values 200c to be used in cells that do not correspond to a cell for which it provides cell specific assistance information. The set of "Spare Random ID" values 200c may e.g., consist of or comprise 5 "Spare Random ID" values 200c wherein each Spare Random ID value 200c is used only once by the wireless device $104_1$ when performing a MTA procedure and is reported as part of the information carried by the RLC Data Block 204 (see FIGS. 2A-2C which illustrate a MTA method information element (including the set of Spare Random ID values 200c) of the RRLP Multilateration Timing Advance Request message 202).

The use of "Spare Random ID" parameter(s) 200b, 200c allows the wireless device $104_1$ to select a cell (for which cell specific assistance information is not provided) and perform the MTA procedure therein and still include the "Spare Random ID" parameter 200b, 200c (originally received as non-cell specific information within the assistance information of the RRLP Multilateration Timing Advance Request message 200) as the "Random ID" parameter 200b, 200c in the RLC Data Block 204.

Upon receiving the RLC Data Block 204, the RAN node $102_1$ forwards the "Random ID" parameter 200a, 200b, 200c along with the timing advance information 230 in report 203 to the positioning node 150, thereby allowing the positioning node 150 to confirm the validity of the reported timing advance information for the corresponding cell.

The following is a more detailed step-by-step description of the improved RLC Data Block method per the first embodiment of the present disclosure:

The positioning node 150 triggers the MTA procedure for a valid wireless device $104_1$ (for example) by sending a RRLP Multilateration Timing Advance Request message 202 to the valid wireless device $104_1$ indicating that the RLC Data Block method is to be used. Per the first embodiment of the present disclosure, the positioning node 150 includes any one of the "Random ID" parameter(s) 200a, 200b, 200c in the RRLP Multilateration Timing Advance Request message 202. The RRLP Multilateration Timing Advance Request message 202 is forwarded by the RAN node $102_1$ to the wireless device $104_1$.

The wireless device $104_1$ upon receipt of the RRLP Multilateration Timing Advance Request message 202 proceeds to perform the RLC Data Block method of the MTA procedure in a cell thereby allowing the RAN node $102_1$ to acquire corresponding timing advance information. In particular, the wireless device $104_1$ upon receipt of the RRLP Multilateration Timing Advance Request message 202 performs the specified MTA procedure and sends a multilateration access request message 206 on the random access channel (RACH) followed by establishing an uplink Temporary Block Flow (TBF) for the transfer of a RLC data block 204. The RLC data block 204 sent by the wireless device $104_1$ includes a Temporary Logical Link Identifier (TLLI) 270, a MS Sync Accuracy parameter 272, a MS Transmission Offset parameter 274, and a "Random ID" parameter 200a, 200b, or 200c, wherein the "Random ID" parameter 200a, 200b, or 200c indicated corresponds to the cell in which the wireless device $104_1$ performed the MTA procedure (note: this "Random ID" parameter 200a, 200b, or 200c was obtained by the wireless device $104_1$ from the RRLP Multilateration Timing Advance Request message 202).

The RAN node $102_1$ upon receiving the RLC data block 204 sent by the wireless device $104_1$ will estimate a timing advance information 230 for the wireless device $104_1$ in the corresponding cell.

The RAN node $102_1$ sends the positioning node 150 a report 203 containing the timing advance information 230 along with the "Random ID" parameter 200a, 200b, or 200c obtained from the RLC data block 204.

The positioning node 150 upon receiving the report 203 uses the "Random ID" parameter 200a, 200b, or 200c to confirm the validity of the reported timing advance information 230 for the corresponding cell. Note: the wireless terminal $104_1$ performs the MTA process in other cells (neighbor cells or even the serving cell which are all managed by the same serving RAN node $102_1$) and sends corresponding RLC data blocks 204 (each including a "Random ID" parameter 200a, 200b, or 200c) to the RAN node $102_1$ as described above. In the event, the wireless device $104_1$ decides to perform the MTA procedure using a cell not managed by the serving RAN node $102_1$ (e.g., a cell managed by RAN node $102_2$) then the non-serving RAN node $102_2$ will forward the information in a RLC data block 204 received from the wireless terminal $104_1$ in that cell to the serving RAN node $102_1$.

Solutions for Enhanced Access Burst Method:

In a second embodiment, the objective of reducing the possibility of a bandit wireless device $104_2$ (for example) from triggering the RAN node $102_1$ (e.g., BSS/BTS $102_1$) (for example) to generate false timing advance (TA) information and report the false TA information to the positioning node 150 (e.g., SMLC 150) is achieved through the introduction of another set of identifier(s) 200d, 200e, 200f, 200g, securely delivered to the valid wireless device $104_1$ in a triggering RRLP Multilateration Timing Advance Request message 202, where the identifier(s) 200d, 200e, 200f, 200g can subsequently be used by the positioning node 150 to link reports 203 received from the serving RAN node $102_1$ to the valid wireless device $104_1$ and the associated instance of the MTA procedure. More specifically, the following improvements can be made for the Extended Access Burst method when selected by the positioning node 150:

The positioning node 150 can include a cell specific "Mini Random ID" parameter 200*d* (e.g., 3 bits long) having a value randomly, or by other means, generated by the positioning node 150 for each cell for which it provides assistance information within the RRLP Multilateration Timing Advance Request message 202 (see FIGS. 2A-2C which illustrate a MTA method information element (including the Mini Random ID parameter 200*d*) of the RRLP Multilateration Timing Advance Request message 202). The number of bits used for this parameter will be determined by the available payload space within the first and second multilateration access request messages 220 and 222 subsequently sent by a wireless device 104$_1$ (for example) using the Extended Access Burst method.

When using a cell identified by assistance information to perform MTA using the Extended Access Burst method, the wireless device 104$_1$ (for example) would include the corresponding "Mini Random ID" parameter 200*d* as part of the payload carried within the second multilateration access request message 222 also referred to as the Extended Access Burst.

The positioning node 150 may also include a "Mini Spare Random ID" parameter 200*e* that does not correspond to a cell for which it provides cell specific assistance information (see FIGS. 2A-2C which illustrate a MTA method information element (including the Mini Spare Random ID parameter 200*e*) in the RRLP Multilateration Timing Advance Request message 202). Alternatively, the positioning node 150 may provide the wireless device 104$_1$ with a set of "Mini Spare Random ID" parameters 200*f* to be used in cells that do not correspond to a cell for which it provides cell specific assistance information (see FIGS. 2A-2C which illustrate a MTA method information element (including the set of Mini Random ID parameters 200*f*) of the RRLP Multilateration Timing Advance Request message 202). The set of "Mini Spare Random ID" parameters 200*f* may e.g., consist of or comprise five "Mini Spare Random ID" parameters wherein each value is used only once by the wireless device 104$_1$ when performing a MTA procedure and is reported as part of the information carried by the second multilateration access request message 222.

The use of the "Mini Spare Random ID" parameter(s) 200*e*, 200*f* allows the wireless device 104$_1$ to select a cell (for which cell specific assistance information is not provided) and perform the MTA procedure therein and still include a "Mini Spare Random ID" parameter 200*e*, 200*f* (originally received as non-cell specific information within the assistance information of the RRLP Multilateration Timing Advance Request message 200) as the "Mini Random ID" parameter 200*e*, 200*f* in the second multilateration access request message 222.

Alternatively, a single sufficiently unique identifier 200*g* (e.g., 3 bits as in the discussion above), generated by the positioning node 105, can be used both in cells for which assistance information is provided in the triggering RRLP Multilateration Timing Advance Request message 200 as well as in cells selected autonomously by the wireless device 104$_1$ (see FIGS. 2A-2C which illustrate a MTA method information element (including the unique identifier parameter 200*g*) in the RRLP Multilateration Timing Advance Request message 202). In both of these cases, the positioning node 150 will be able to use the single sufficiently unique identifier 200*g* to confirm the validity of the reported timing advance value.

Upon receiving the first and second multilateration access request messages 220 and 223, the RAN node 102$_1$ forwards the "Mini Random ID" parameter 200*d*, 200*e*, 200*f*, or 200*g* (along with the timing advance information 230) in report 203 to the positioning node 105, thereby allowing the positioning node 150 to confirm the validity of the reported timing advance information for the corresponding cell.

The following is a more detailed step-by-step description of the improved Extended Access Burst method per the second embodiment of the present disclosure:

The positioning node 150 triggers the MTA procedure for a valid wireless device 104$_1$ (for example) by sending a RRLP Multilateration Timing Advance Request message 202 to the valid wireless device 104$_1$ indicating the Extended Access Burst method is to be used. Per the second embodiment of the present disclosure, the positioning node 150 includes any one of the "Mini Random ID" parameter(s) 200*d*, 200*e*, 200*f*, 200*g* in the RRLP Multilateration Timing Advance Request message 202. The RRLP Multilateration Timing Advance Request message 202 is forwarded by the RAN node 102$_1$ to the wireless device 104$_1$.

The wireless device 104$_1$ upon receipt of the RRLP Multilateration Timing Advance Request message 202 proceeds to perform the Extended Access Burst method of the MTA procedure in a cell thereby allowing the RAN node 102$_1$ to acquire corresponding timing advance information 230. In particular, the wireless device 104$_1$ upon receipt of the RRLP Multilateration Timing Advance Request message 202 performs the specified MTA procedure and sends a first multilateration access request message 220 on the random access channel (RACH) using an Access Burst followed by sending a second multilateration access request message 222 on the random access channel (RACH) using a Normal Burst. The payload within the first multilateration access request message 220 includes a MS Transmission Offset parameter 274. The payload with the second multilateration access request message 222 includes the MS Sync Accuracy 272 and the "Mini Random ID" parameter 200*d*, 200*e*, 200*f*, 200*g*, where the "Mini Random ID" parameter 200*d*, 200*e*, 200*f*, 200*g* indicated corresponds to the cell in which the wireless device 104$_1$ performed the MTA procedure.

The RAN node 102$_1$ upon receiving the first and second multilateration access request messages 220 and 222 sent by the wireless device 104$_1$ will estimate a timing advance information 230 for the wireless device 104$_1$.

The RAN node 102$_1$ sends the positioning node 150 a report 203 containing the timing advance information 230 along with the "Mini Random ID" parameter 200*d*, 200*e*, 200*f*, or 200*g* obtained from the second multilateration access request message 222.

The positioning node 150 upon receiving the report 203 uses the "Mini Random ID" parameter 200*d*, 200*e*, 200*f*, or 200*g* to confirm the validity of the reported timing advance information 230 for the corresponding MTA Reference ID. Note: the wireless terminal 104$_1$ performs the MTA process in other cells (neighbor cells or even the serving cell which are all managed by the same serving RAN node 102$_1$) and sends the corresponding first and second multilateration access request messages 220 and 222 to the RAN node $102_1$ as described above. In the event, the wireless device $104_1$ decides to perform the MTA procedure using a cell not managed by the serving RAN node $102_1$ (e.g. a cell managed by RAN node $102_2$) then the non-serving RAN node $102_2$ will forward the information in the first and second multilateration access request messages 220 and 222 received from the wireless terminal $104_1$ in that cell to the serving RAN node $102_1$.

Basic Functionalities-Configurations of Positioning Node 150, Wireless Device $104_1$ (for Example) and RAN Node $102_1$ (for Example)

Figure 3:
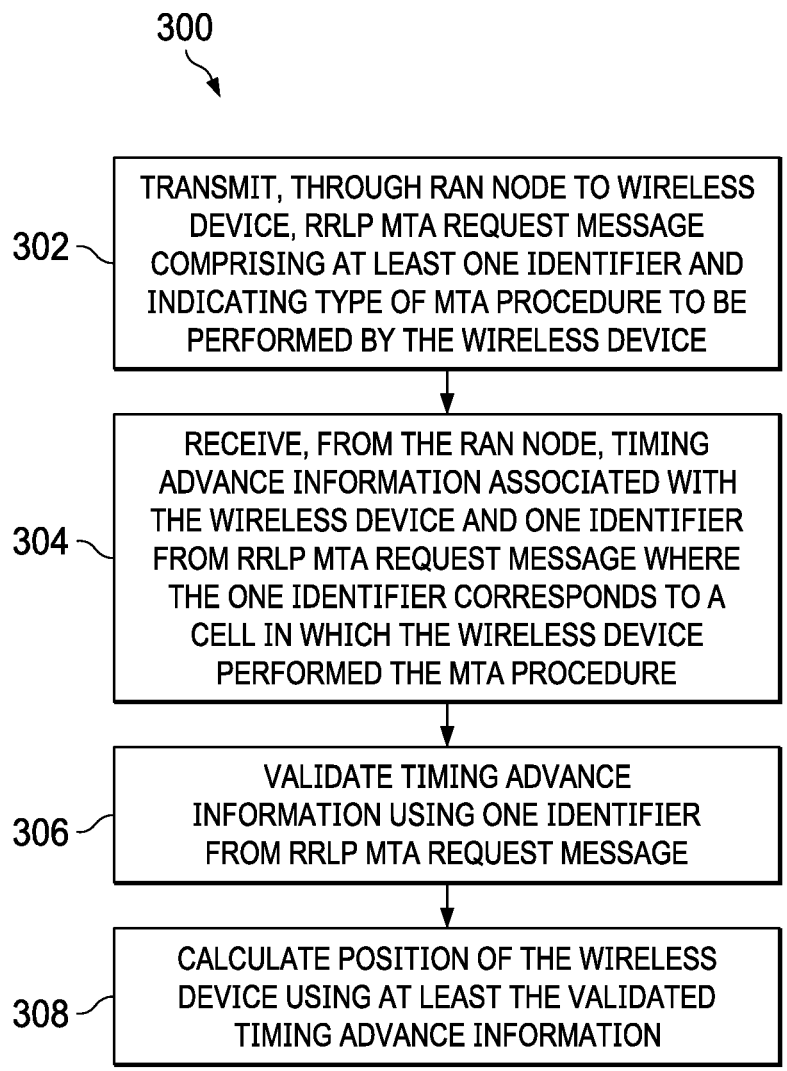
FIG. 3 is a flowchart of a method implemented in the positioning node in accordance with an embodiment of the present disclosure.

Referring to FIG. 3, there is a flowchart of a method 300 implemented in the positioning node 150 (e.g., SMLC 150) configured to interact with the RAN node $102_1$ (e.g., BSS/BTS $102_1$) and the wireless device $104_1$. At step 302, the positioning node 150 transmits, through the RAN node $102_1$ to the wireless device $104_1$, a RRLP Multilateration Timing Advance Request message 202 comprising at least one identifier 200a, 200b, 200c, 200d, 200e, 200f, 200g and indicating a type of MTA procedure that is to be performed by the wireless device $104_1$ (see discussion below regarding the different types of MTA procedures and the different types of identifiers 200a, 200b, 200c, 200d, 200e, 200f, 200g). At step 304, the positioning node 150 receives, from the RAN node $102_1$, timing advance information 230 associated with the wireless device $104_1$ in a cell for which the MTA procedure has been performed, and one identifier 200a, 200b, 200c, 200d, 200e, 200f or 200g corresponding to one of the at least one identifier 200a, 200b, 200c, 200d, 200e, 200f, 200g within the RRLP Multilateration Timing Advance Request message 202, wherein the identifier 200a, 200b, 200c, 200d, 200e, 200f or 200g corresponds to the cell in which the wireless device $104_1$ performed the MTA procedure. At step 306, the positioning node 150 validates the timing advance information 230 using the received identifier 200a, 200b, 200c, 200d, 200e, 200f, or 200g. At step 308, the positioning node 150 calculates a position of the wireless device $104_1$ using at least the validated timing advance information 230 (note: the positioning node 150 can calculate a position of the wireless device $104_1$ using multiple instances of validated timing advance information 230 wherein each validated instance corresponds to a specific cell in which the wireless device $104_1$ has performed the MTA procedure). In one embodiment, the RRLP Multilateration Timing Advance Request message 202 indicates that the type of MTA procedure is a RLC Data Block method, and the at least one identifier 200a, 200b, 200c, 200d, 200e, 200f, 200g within the RRLP Multilateration Timing Advance Request message 202 comprises: a cell specific Random ID parameter 200a for each cell that the RRLP Multilateration Timing Advance Request message 202 provides cell specific assistance information; and a Spare Random ID parameter 200b or a set of Spare Random ID parameters 200c which do not correspond to a cell identified in the RRLP Multilateration Timing Advance Request message 202. In another embodiment, the RRLP Multilateration Timing Advance Request message 202 indicates that the type of MTA procedure is an Extended Access Burst method, and the at least one identifier 200a, 200b, 200c, 200d, 200e, 200f, 200g within the RRLP Multilateration Timing Advance Request message 202 comprises: a cell specific Mini Random ID parameter 200d for each cell that the RRLP Multilateration Timing Advance Request message 202 provides cell specific assistance information; and a Mini Spare Random ID parameter 200e or a set of Mini Spare Random ID parameters 200f which do not correspond to a cell identified in the RRLP Multilateration Timing Advance Request message 202. In yet another embodiment, the RRLP Multilateration Timing Advance Request message 202 indicates that the type of MTA procedure is an Extended Access Burst method, and the at least one identifier 200a, 200b, 200c, 200d, 200e, 200f, 200g within the RRLP Multilateration Timing Advance Request message 202 comprises a unique identifier 200g for cells that are and are not identified in the RRLP Multilateration Timing Advance Request message 202.

Figure 4:
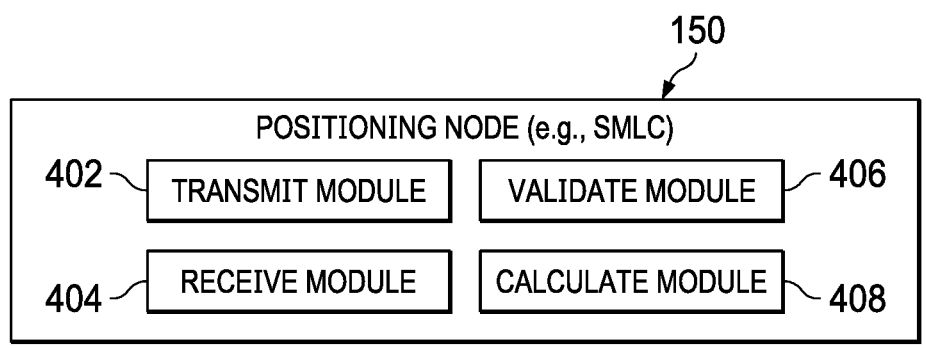
FIG. 4 is a block diagram illustrating a structure of the positioning node configured in accordance with an embodiment of the present disclosure.

Referring to FIG. 4, there is a block diagram illustrating structures of an exemplary positioning node 150 (e.g., SMLC 150) configured in accordance with an embodiment of the present disclosure. In one embodiment, the positioning node 150 comprises a transmit module 402, a receive module 404, a validate module 406, and a calculate module 408. The transmit module 402 is configured to transmit, through the RAN node $102_1$ to the wireless device $104_1$, a RRLP Multilateration Timing Advance Request message 202 comprising at least one identifier 200a, 200b, 200c, 200d, 200e, 200f, 200g and indicating a type of MTA procedure that is to be performed by the wireless device $104_1$ (see discussion above regarding the different types of MTA procedures and the different types of identifiers 200a, 200b, 200c, 200d, 200e, 200f, 200g). The receive module 404 is configured to receive, from the RAN node $102_1$, timing advance information 230 associated with the wireless device $104_1$ in a cell for which the MTA procedure has been performed, and one identifier 200a, 200b, 200c, 200d, 200e, 200f or 200g corresponding to one of the at least one identifier 200a, 200b, 200c, 200d, 200e, 200f, 200g within the RRLP Multilateration Timing Advance Request message 202, wherein the identifier 200a, 200b, 200c, 200d, 200e, 200f or 200g corresponds to the cell in which the wireless device $104_1$ performed the MTA procedure. The validate module 406 is configured to validate the timing advance information 230 using the received identifier 200a, 200b, 200c, 200d, 200e, 200f, or 200g. The calculate module 408 is configured to calculate a position of the wireless device $104_1$ using at least the validated timing advance information 230 (note: the calculate module 408 can calculate a position of the wireless device $104_1$ using multiple instances of validated timing advance information 230 wherein each validated instance corresponds to a specific cell in which the wireless device $104_1$ has performed the MTA procedure). In addition, it should be noted that the positioning node 150 may also include other components, modules or structures which are well-known, but for clarity, only the components, modules or structures needed to describe the features of the present disclosure are described herein.

Figure 5:
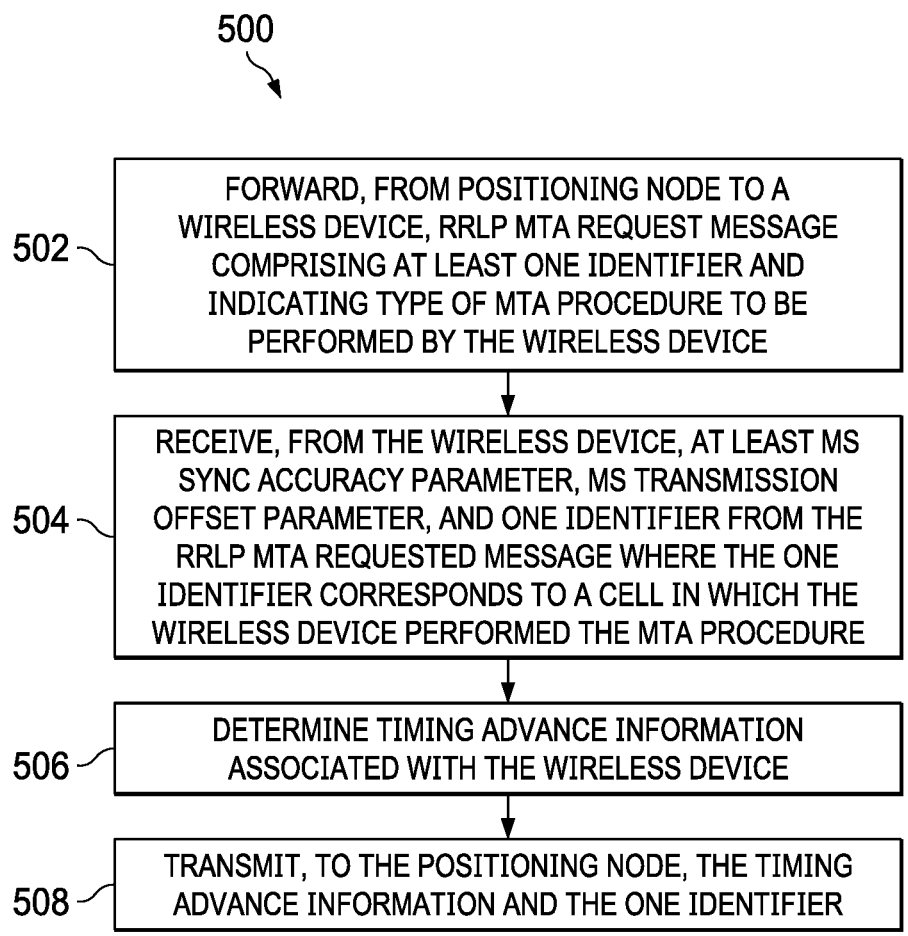
FIG. 5 is a flowchart of a method implemented in the RAN node in accordance with an embodiment of the present disclosure.

As those skilled in the art will appreciate, the above-described modules 402, 404, 406, and 408 of the positioning node 150 may be implemented as suitable dedicated circuit. Further, the modules 402, 404, 406, and 408 can also be implemented using any number of dedicated circuits through functional combination or separation. In some embodiments, the modules 402, 404, 406, and 408 may be even combined in a single application specific integrated circuit (ASIC). As an alternative software-based implementation, the positioning node 150 may comprise a memory 164, a processor 162 (including but not limited to a microprocessor, a microcontroller or a Digital Signal Processor (DSP), etc.) and a transceiver 166. The memory 164 stores machine-readable program code executable by the processor 162 to cause the positioning node 150 to perform the steps of the above-described method 300. Referring to FIG. 5, there is a flowchart of a method 500 implemented in the RAN node $102_1$ (e.g., BSS/BTS $102_1$) which is configured to interact with a positioning node 150 (e.g., SMLC 150) and a wireless device $104_1$ in accordance with an embodiment of the present disclosure. At step 502, the RAN node $102_1$ forwards a RRLP Multilateration Timing Advance Request message 202 received from the positioning node 150 to the wireless device $104_1$, wherein the RRLP Multilateration Timing Advance Request message 202 comprises at least one identifier 200a, 200b, 200c, 200d, 200e, 200f, 200g and indicates a type of MTA procedure that is to be performed by the wireless device $104_1$ (see discussion above regarding the different types of MTA procedures and the different types of identifiers 200a, 200b, 200c, 200d, 200e, 200f, 200g). At step 504, the RAN node $102_1$ receives, from the wireless device $104_1$, at least a Mobile Station (MS) Sync Accuracy parameter 272, a MS Transmission Offset parameter 274, and one identifier 200a, 200b, 200c, 200d, 200e, 200f or 200g corresponding to one of the at least one identifier 200a, 200b, 200c, 200d, 200e, 200f, 200g within the RRLP Multilateration Timing Advance Request message 202, wherein the one identifier 200a, 200b, 200c, 200d, 200e, 200f, or 200g also corresponds to the cell in which the wireless device $104_1$ performed the MTA procedure (note 1: when the type of MTA procedure is the RLC Data Block method then a Temporary Logical Link Identifier (TLLI) 270, the MS Sync Accuracy parameter 272, the MS Transmission Offset parameter 274, and the one identifier 200a, 200b, or 200c are received from the wireless device $104_1$ in a RLC Data Block 204) (note 2: when the type of MTA procedure is the Extended Access Burst method then the MS Transmission Offset parameter 274 is received from the wireless device $104_1$ in a first multilateration access request message 220, and the MS Sync Accuracy parameter 272, and the one identifier 200d, 200e, 200f, or 200g, are received from the wireless device $104_1$ in a second multilateration message 222). At step 506, the RAN node $102_1$ determines timing advance information 230 using at least the MS Sync Accuracy parameter 272 and the MS Transmission Offset parameter 274, wherein the timing advance information 230 is associated with the wireless device $104_1$. At step 508, the RAN node $102_1$ transmits, to the positioning node 150, the timing advance information 230 and the one identifier 200a, 200b, 200c, 200d, 200e, 200f, or 200g associated with the wireless device $104_1$, wherein the identifier 200a, 200b, 200c, 200d, 200e, 200f, or 200g corresponds to the cell in which the wireless device $104_1$ performed the MTA procedure.

Figure 6:
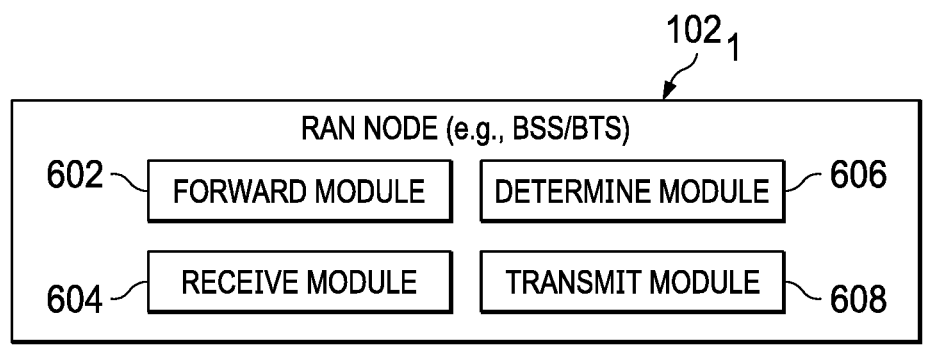
FIG. 6 is a block diagram illustrating a structure of the RAN node configured in accordance with an embodiment of the present disclosure.

Referring to FIG. 6, there is a block diagram illustrating structures of an exemplary RAN node $102_1$ configured in accordance with an embodiment of the present disclosure. In one embodiment, the RAN node $102_1$ comprises a forward module 602, a receive module 604, a determine module 606, and a transmit module 608. The forward module 602 is configured to forward a RRLP Multilateration Timing Advance Request message 202 received from the positioning node 150 to the wireless device $104_1$, wherein the RRLP Multilateration Timing Advance Request message 202 comprises at least one identifier 200a, 200b, 200c, 200d, 200e, 200f, 200g and indicates a type of MTA procedure that is to be performed by the wireless device $104_1$ (see discussion above regarding the different types of MTA procedures and the different types of identifiers 200a, 200b, 200c, 200d, 200e, 200f, 200g). The receive module 604 is configured to receive, from the wireless device $104_1$, at least a Mobile Station (MS) Sync Accuracy parameter 272, a MS Transmission Offset parameter 274, and one identifier 200a, 200b, 200c, 200d, 200e, 200f or 200g corresponding to one of the at least one identifier 200a, 200b, 200c, 200d, 200e, 200f, 200g within the RRLP Multilateration Timing Advance Request message 202, wherein the one identifier 200a, 200b, 200c, 200d, 200e, 200f, or 200g also corresponds to the cell in which the wireless device $104_1$ performed the MTA procedure (note 1: when the type of MTA procedure is the RLC Data Block method then a Temporary Logical Link Identifier (TLLI) 270, the MS Sync Accuracy parameter 272, the MS Transmission Offset parameter 274, and the one identifier 200a, 200b, or 200c are received from the wireless device $104_1$ in a RLC Data Block 204) (note 2: when the type of MTA procedure is the Extended Access Burst method then the MS Transmission Offset parameter 274 is received from the wireless device $104_1$ in a first multilateration access request message 220, and the MS Sync Accuracy parameter 272, and the one identifier 200d, 200e, 200f, or 200g, are received from the wireless device $104_1$ in a second multilateration message 222). The determine module 606 is configured to determine timing advance information 230 using at least the MS Sync Accuracy parameter 272 and the MS Transmission Offset parameter 274, wherein the timing advance information 230 is associated with the wireless device $104_1$. The transmit module 608 is configured to transmit, to the positioning node 150, the timing advance information 230 and the one identifier 200a, 200b, 200c, 200d, 200e, 200f, or 200g associated with the wireless device $104_1$, wherein the identifier 200a, 200b, 200c, 200d, 200e, 200f, or 200g corresponds to the cell in which the wireless device $104_1$ performed the MTA procedure. In addition, it should be noted that the RAN node $102_1$ may also include other components, modules or structures which are well-known, but for clarity, only the components, modules or structures needed to describe the features of the present disclosure are described herein.

As those skilled in the art will appreciate, the above-described modules 602, 604, 608, and 610 of the RAN node $102_1$ may be implemented as suitable dedicated circuit. Further, the modules 602, 604, 608, and 610 can also be implemented using any number of dedicated circuits through functional combination or separation. In some embodiments, the modules 602, 604, 608, and 610 may be even combined in a single application specific integrated circuit (ASIC). As an alternative software-based implementation, the RAN node $102_1$ may comprise a memory $134_1$, a processor $132_1$ (including but not limited to a microprocessor, a microcontroller or a Digital Signal Processor (DSP), etc.) and a transceiver $122_1$. The memory $134_1$ stores machine-readable program code executable by the processor $132_1$ to cause the RAN node $102_1$ to perform the steps of the above-described method 500. Note: the other RAN node $102_2$ may be configured the same as RAN node $102_1$.

Figure 7:
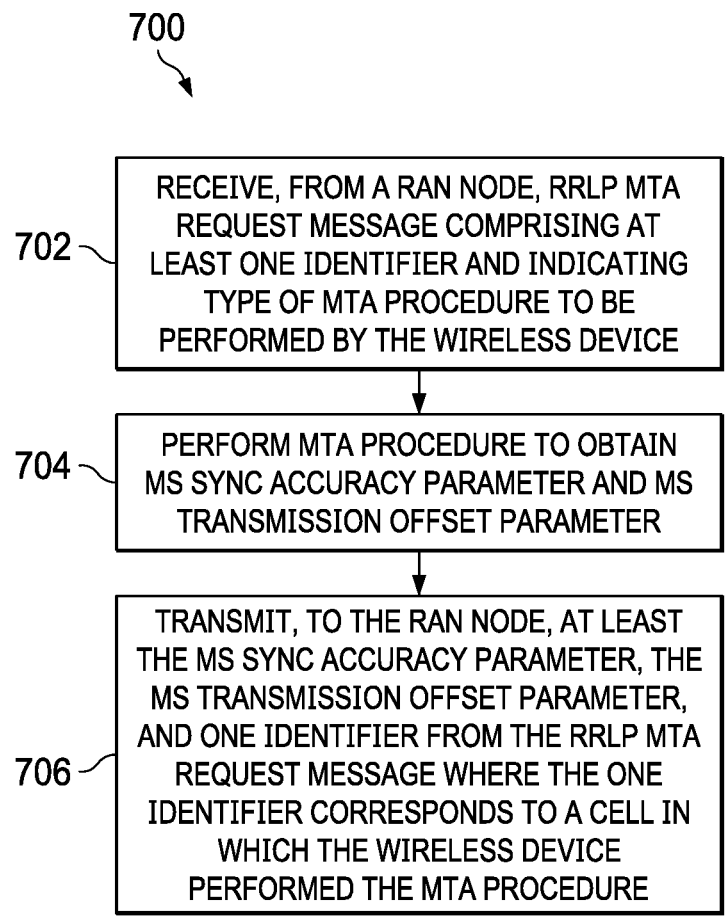
FIG. 7 is a flowchart of a method implemented in the wireless device in accordance with an embodiment of the present disclosure; and, FIG. 8 is a block diagram illustrating a structure of the wireless device configured in accordance with an embodiment of the present disclosure.

Referring to FIG. 7, there is a flowchart of a method 700 implemented in the wireless device $104_1$ which is configured to interact with the positioning node 150 (e.g., SMLC 150) and the RAN node $102_1$ (e.g., BSS/BTS $102_1$) in accordance with an embodiment of the present disclosure. At step 702, the wireless device $104_1$ receives, from the positioning node 150 through the RAN node $102_1$, a RRLP Multilateration Timing Advance Request message 202 comprising at least one identifier 200a, 200b, 200c, 200d, 200e, 200f, 200g and indicating a type of MTA procedure that is to be performed by the wireless device $104_1$ (see discussion above regarding the different types of MTA procedures and the different types of identifiers 200a, 200b, 200c, 200d, 200e, 200f, 200g). At step 704, the wireless device $104_1$ performs the MTA procedure to obtain a MS Sync Accuracy parameter 272, and a MS Transmission Offset parameter 274. At step 706, the wireless device $104_1$ transmits, to the RAN node $102_1$, at least the MS Synch Accuracy parameter 272, the MS Transmission Offset parameter 274, and one identifier 200a, 200b, 200c, 200d, 200e, 200f, or 200g corresponding to one of the at least one identifier 200a, 200b, 200c, 200d, 200e, 200f, 200g within the RRLP Multilateration Timing Advance Request message 202, wherein the identifier 200a, 200b, 200c, 200d, 200e, 200f, or 200g corresponds to the cell in which the wireless device $104_1$ performed the MTA procedure (note 1: when the type of MTA procedure is the RLC Data Block method then a Temporary Logical Link Identifier (TLLI) 270, the MS Sync Accuracy parameter 272, the MS Transmission Offset parameter 274, and the one identifier 200a, 200b, or 200c are transmitted from the wireless device $104_1$ in a RLC Data Block 204) (note 2: when the type of MTA procedure is the Extended Access Burst method then the MS Transmission Offset parameter 274 is transmitted from the wireless device $104_1$ in a first multilateration access request message 220, and the MS Sync Accuracy parameter 272, and the one identifier 200d, 200e, 200f, or 200g are transmitted from the wireless device $104_1$ in a second multilateration message 222).

Figure 8:
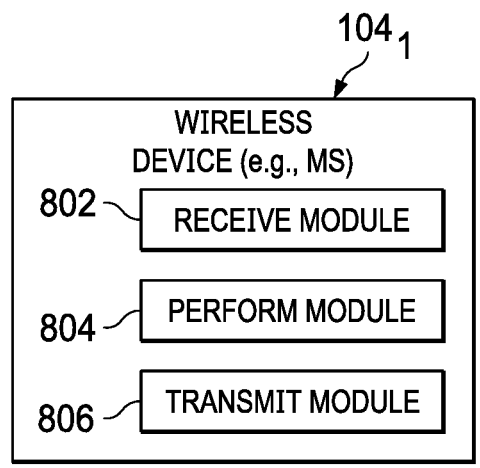

Referring to FIG. 8, there is a block diagram illustrating structures of an exemplary wireless device $104_1$ configured in accordance with an embodiment of the present disclosure. In one embodiment, the wireless device $104_1$ comprises a receive module 802, a perform module 804, and a transmit module 806. The receive module 802 is configured to receive, from the positioning node 150 through the RAN node $102_1$, a RRLP Multilateration Timing Advance Request message 202 comprising at least one identifier 200a, 200b, 200c, 200d, 200e, 200f, 200g and indicating a type of MTA procedure that is to be performed by the wireless device $104_1$ (see discussion above regarding the different types of MTA procedures and the different types of identifiers 200a, 200b, 200c, 200d, 200e, 200f, 200g). The perform module 804 is configured to perform the MTA procedure to obtain a MS Sync Accuracy parameter 272, and a MS Transmission Offset parameter 274. The transmit module 806 is configured to transmit, to the RAN node $102_1$, at least the MS Sync Accuracy parameter 272, the MS Transmission Offset parameter 274, and one identifier 200a, 200b, 200c, 200d, 200e, 200f, or 200g corresponding to one of the at least one identifier 200a, 200b, 200c, 200d, 200e, 200f, 200g within the RRLP Multilateration Timing Advance Request message 202, wherein the identifier 200a, 200b, 200c, 200d, 200e, 200f, or 200g corresponds to the cell in which the wireless device $104_1$ performed the MTA procedure (note 1: when the type of MTA procedure is the RLC Data Block method then a Temporary Logical Link Identifier (TLLI) 270, the MS Synch Accuracy parameter 272, the MS Transmission Offset parameter 274, and the one identifier 200a, 200b, or 200c are transmitted from the wireless device $104_1$ in a RLC Data Block 204) (note 2: when the type of MTA procedure is the Extended Access Burst method then the MS Transmission Offset parameter 274 is transmitted from the wireless device $104_1$ in a first multilateration access request message 220, and the MS Sync Accuracy parameter 272, and the one identifier 200d, 200e, 200f, or 200g are transmitted from the wireless device $104_1$ in a second multilateration message 222). In addition, it should be noted that the wireless device $104_1$ may also include other components, modules or structures which are well-known, but for clarity, only the components, modules or structures needed to describe the features of the present disclosure are described herein.

As those skilled in the art will appreciate, the above-described modules 802, 804, and 806 of the wireless device $104_1$ may be implemented as suitable dedicated circuit. Further, the modules 802, 804, and 806 can also be implemented using any number of dedicated circuits through functional combination or separation. In some embodiments, the modules 802, 804, and 806 may be even combined in a single application specific integrated circuit (ASIC). As an alternative software-based implementation, the wireless device $104_1$ may comprise a memory $120_1$, a processor $118_1$ (including but not limited to a microprocessor, a microcontroller or a Digital Signal Processor (DSP), etc.) and a transceiver $110_1$. The memory $120_1$ stores machine-readable program code executable by the processor $118_1$ to cause the wireless device $104_1$ to perform the steps of the above-described method 800. Note: the other wireless devices $104_2$, $104_3$ ... $104_n$ may be configured the same as wireless device $104_1$.

In view of the foregoing, it should be appreciated that embodiments described herein are illustrated by exemplary embodiments. It should also be appreciated that these embodiments are not mutually exclusive. That is, the components from one embodiment may be tacitly assumed to be present in another embodiment and it will be obvious to a person skilled in the art how those components may be used in the other exemplary embodiments.

Further, the embodiments described herein have been mainly exemplified with GSM/EDGE as the communications network 100 but generally they are applicable to other existing communications networks such as Narrow Band Internet of Things (NB-IoT) and enhanced Machine Type Communication (eMTC) or even to future networks such as 5G and next radio. The radio access node $102_1$, $102_2$ has been exemplified with a BSS $102_1$, $102_2$, but generally it may be another radio access node serving the communication Evolved Node B (eNb) as well. For example for eMTC and NB-IoT the applicable radio access node $102_1$, $102_2$ may also be an eNb. The communication (wireless) device $104_1$, $104_2$, $104_3$ ... $104_4$ has been exemplified as a mobile station $104_1$, $104_2$, $104_3$ ... $104_4$, sometimes also referred to as the device. The positioning node 150 has been exemplified with an SMLC but it may also be an Evolved SMLC (E-SMLC) in the case of NB-IoT, eMTC and Long-Term Evolution (LTE).

It should furthermore be noted that, to anyone skilled in the art, there are several realizations of the embodiments described herein with principally equivalent functionality where e.g. introduced fields may be longer or shorter or coded in a different way. An objective of the embodiments herein is to introduce procedures and the corresponding needed modified or new messages/information elements/fields to reduce the possibility of a bandit wireless device $104_2$ (for example) triggering a RAN node $102_1$ (e.g., BSS/BTS $102_1$) to generate false timing advance information and report the false timing advance information to the positioning node 150 (e.g., SMLC 150) which could lead the positioning node 150 (e.g., SMLC 150) to estimate with degraded accuracy a position of the valid wireless device $104_1$ (for example).

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that has been set forth and defined within the following claims.

The invention claimed is:

1. A Radio Access Network (RAN) node configured to interact with a positioning node and a wireless device, the RAN node comprising:
   a processor; and,
   a memory that stores processor-executable instructions, wherein the processor interfaces with the memory to execute the processor-executable instructions, whereby the RAN node is operable to:
      forward a Radio Resource Location Services Protocol (RRLP) Multilateration Timing Advance Request message received from the positioning node to the wireless device, wherein the RRLP Multilateration Timing Advance Request message comprises at least one identifier and indicates a type of Multilateration Timing Advance (MTA) procedure that is to be performed by the wireless device;
      receive, from the wireless device, at least a Mobile Station (MS) Sync Accuracy parameter, a MS Transmission Offset parameter, and one identifier corresponding to one of the at least one identifier within the RRLP Multilateration Timing Advance Request message, wherein the one identifier also corresponds to a cell in which the wireless device performed the MTA procedure;
      determine (timing advance information using at least the MS Sync Accuracy parameter and the MS Transmission Offset parameter, wherein the timing advance information is associated with the wireless device; and,
      transmit, to the positioning node, the timing advance information and the one identifier associated with the wireless device.

2. The RAN node of claim 1, wherein the type of MTA procedure is a Radio Link Control (RLC) Data Block method, and wherein a Temporary Logical Link Identifier (TLLI) of the wireless device, the MS Sync Accuracy parameter, the MS Transmission Offset parameter, and the one identifier are received from the wireless device in a RLC Data Block.

3. The RAN node of claim 2, wherein the at least one identifier within the RRLP Multilateration Timing Advance Request message comprises:
   a cell specific Random ID parameter for each cell that the RRLP Multilateration Timing Advance Request message provides cell specific assistance information; and
   a Spare Random ID parameter or a set of Spare Random ID parameters which do not correspond to a cell identified in the RRLP Multilateration Timing Advance Request message.

4. The RAN node of claim 1, wherein the type of MTA procedure is an Extended Access Burst method, wherein the MS Transmission Offset parameter is received from the wireless device in a first multilateration access request message, and wherein the MS Sync Accuracy parameter and the one identifier are received from the wireless device in a second multilateration message.

5. The RAN node of claim 4, wherein the at least one identifier within the RRLP Multilateration Timing Advance Request message comprises:
   a cell specific Mini Random ID parameter for each cell that the RRLP Multilateration Timing Advance Request message provides cell specific assistance information; and
   a Mini Spare Random ID parameter or a set of Mini Spare Random ID parameters which do not correspond to a cell identified in the RRLP Multilateration Timing Advance Request message.

6. The RAN node of claim 4, wherein the at least one identifier within the RRLP Multilateration Timing Advance Request message comprises:
   a unique identifier for cells that are and are not identified in the RRLP Multilateration Timing Advance Request message.

7. A method in a Radio Access Network (RAN) node configured to interact with a positioning node and a wireless device, the method comprising:
   forwarding a Radio Resource Location Services Protocol (RRLP) Multilateration Timing Advance Request message received from the positioning node to the wireless device, wherein the RRLP Multilateration Timing Advance Request message comprises at least one identifier and indicates a type of Multilateration Timing Advance (MTA) procedure that is to be performed by the wireless device;
   receiving, from the wireless device, at least a Mobile Station (MS) Sync Accuracy parameter, a MS Transmission Offset parameter, and one identifier corresponding to one of the at least one identifier within the RRLP Multilateration Timing Advance Request message, wherein the one identifier also corresponds to a cell in which the wireless device performed the MTA procedure;
   determining timing advance information using at least the MS Sync Accuracy parameter and the MS Transmission Offset parameter, wherein the timing advance information is associated with the wireless device; and,
   transmitting, to the positioning node, the timing advance information and the one identifier associated with the wireless device.

8. The method of claim 7, wherein the type of MTA procedure is a Radio Link Control (RLC) Data Block method, and wherein a Temporary Logical Link Identifier (TLLI) of the wireless device, the MS Sync Accuracy parameter, the MS Transmission Offset parameter, and the one identifier are received from the wireless device in a RLC Data Block.

9. The method of claim 8, wherein the at least one identifier within the RRLP Multilateration Timing Advance Request message comprises:
   a cell specific Random ID parameter for each cell that the RRLP Multilateration Timing Advance Request message provides cell specific assistance information; and
   a Spare Random ID parameter or a set of Spare Random ID parameters which do not correspond to a cell identified in the RRLP Multilateration Timing Advance Request message.

10. The method of claim 7, wherein the type of MTA procedure is an Extended Access Burst method, wherein the MS Transmission Offset is received from the wireless device in a first multilateration access request message, and wherein the MS Sync Accuracy parameter and the one identifier are received from the wireless device in a second multilateration message.

11. The method of claim 10, wherein the at least one identifier within the RRLP Multilateration Timing Advance Request message comprises:
   a cell specific Mini Random ID parameter for each cell that the RRLP Multilateration Timing Advance Request message provides cell specific assistance information; and
   a Mini Spare Random ID parameter or a set of Mini Spare Random ID parameters which do not correspond to a cell identified in the RRLP Multilateration Timing Advance Request message.

12. The method of claim 10, wherein the at least one identifier within the RRLP Multilateration Timing Advance Request message comprises:
   a unique identifier for cells that are and are not identified in the RRLP Multilateration Timing Advance Request message.

* * * * *